June 19, 1962 A. F. BOFF 3,040,273
VOLTAGE TO FREQUENCY CONVERTER
Filed April 28, 1958 2 Sheets-Sheet 1
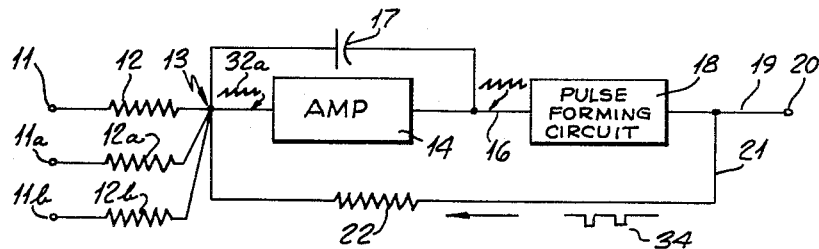
FIG_1
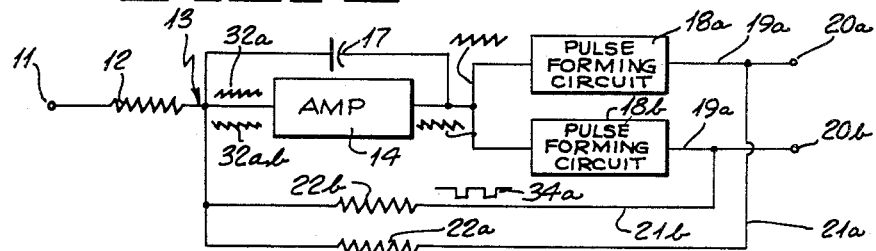
FIG_2
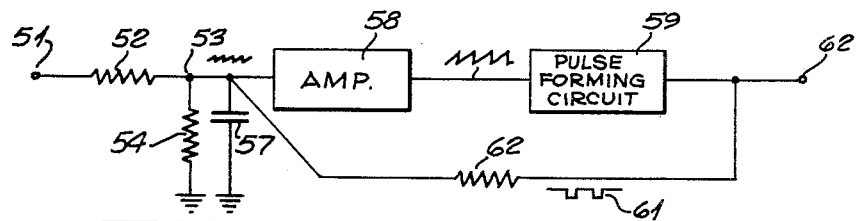
FIG_3
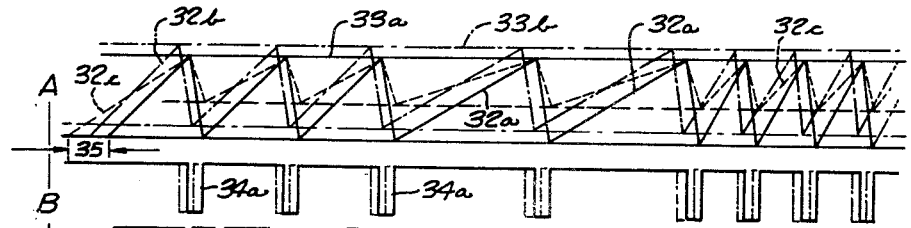
FIG_4
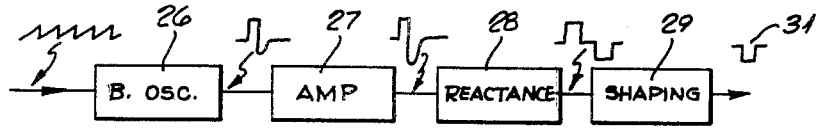
FIG_5
ALBERT F. BOFF
INVENTOR.
BY
ATTORNEYS

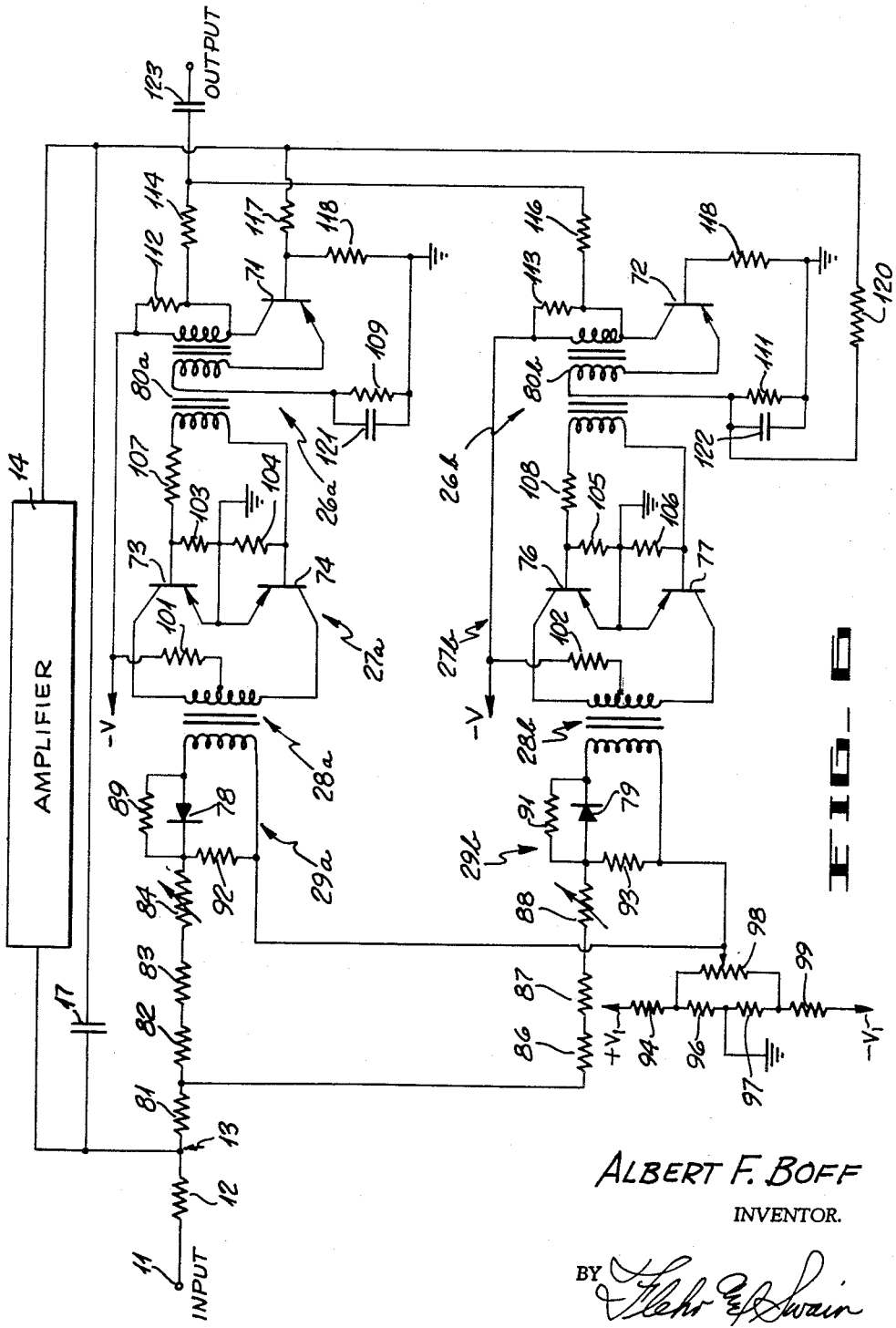

United States Patent Office 3,040,273
Patented June 19, 1962

3,040,273
VOLTAGE TO FREQUENCY CONVERTER
Albert F. Boff, Palo Alto, Calif., assignor to Hewlett-Packard Company, a corporation of California
Filed Apr. 28, 1958, Ser. No. 731,181
2 Claims. (Cl. 332—14)

This invention relates generally to voltage to frequency converters.

In many applications it is desirable to convert a voltage, such as the voltage output of a transducer into a signal whose frequency is indicative of the voltage. The signal frequency may then be measured to give an indication of the output voltage of the transducer. In telemetering systems, it is relatively easy to transmit a signal of the above character, whereas it is rather difficult to transmit the voltage output of a transducer.

So-called analog to digital (voltage to frequency) converters are known in the prior art. In one type of converter a capacitor having relatively stable characteristics is charged a predetermined value and then completely discharged. The frequency at which the capacitor is charged and discharged is an indication of the magnitude of the input voltage. Changes in capacitor characteristics lead to errors in the output signal frequency. Because of the character of prior art voltage to frequency converters, it is difficult to obtain an output signal of zero frequency for zero input voltage.

It is a general object of the present invention to provide an improved voltage to frequency converter.

It is another object of the present invention to provide a voltage to frequency converter employing a capacitor in a novel system whereby operation of the system is relatively independent of changes in capacitor characteristics.

It is another object of the present invention to provide a voltage to frequency converter which employs a capacitor in a novel system whereby it need not be completely discharged during each cycle.

It is a further object of the present invention to provide a voltage to frequency converter in which the capacitor is charged by the input voltage and in which means are provided for developing feedback pulses of fixed energy to discharge the capacitor a predetermined amount, the frequency of the feedback pulse being indicative of the input voltage.

It is a further object of the present invention to provide a voltage to frequency converter in which a capacitor is charged by the input voltage, and in which trigger means serve to form feedback pulses of predetermined area, the operation of said converter being independent of changes in capacitance of the capacitor and of changes in trigger level of the trigger means.

These and other objects of the invention will become more clearly apparent from the following description when taken in conjunction with the accompanying drawings.

Referring to the drawing:

FIGURE 1 shows a block diagram of a voltage to frequency conversion system in accordance with the invention;

FIGURE 2 shows a block diagram of a conversion system similar to that of FIGURE 1 capable of measuring input voltages of either polarity;

FIGURE 3 shows another embodiment of the invention;

FIGURE 4 shows the waveforms appearing at various points in and illustrating the operation of the systems of FIGURES 1, 2 and 3;

FIGURE 5 shows a block diagram of a circuit suitable for deriving pulses of predetermined fixed area; and FIGURE 6 shows a complete circuit diagram of a device in accordance with the invention, and of which the block diagram of FIGURE 2 is a representation.

Referring to the block diagram of FIGURE 1, the input signal is applied to the terminal 11 which is resistively connected through resistor 12 to the node 13. An amplifier 14 has its input connected to the node. The amplified signal appears at the line 16. A capacitor 17 is connected in shunt with the amplifier 14, having one terminal connected to the line 16 and its other terminal to the node 13. A pulse forming circuit 18 is connected to line 16 to receive the output of the amplifier 14. The output of the circuit 18 appears on the line 19 which includes an output terminal 20. A feedback line 21 including series resistor 22 provides means for feeding the output of the circuit 18 back to the node 13.

The amplifier 14 is preferably a high gain amplifier of the D.-C. type. The amplifier may be of the voltage stabilized chopper type or any other high gain amplifier capable of amplifying slowly varying voltages. Amplifiers of this type are well known in the art.

The pulse forming circuit 18 generates an output pulse having constant predetermined area each time the voltage applied to its input reaches a predetermined value. The circuit provides pulses, each pulse having a fixed predetermined energy regardless of the frequency at which the pulses are formed.

A suitable pulse forming circuit is shown in block diagram in FIGURE 5. The circuit shown includes a blocking oscillator 26 which is triggered when the voltage applied thereto reaches a predetermined amplitude, as indicated by the sawtooth wave at its input. The oscillator is adjusted whereby it undergoes one cycle of oscillation each time it is triggered. The output is illustrated on the output line. This signal is then amplified by amplifier 27 and applied to a saturable reactance 28. The amplified signal has an amplitude such that the reactance is driven well into saturation. As is well known, under these conditions the output of the reactance will have a constant area. The output of the reactance 28 is applied to a shaping circuit 29, which may comprise a diode, to form an output pulse 31 of a single predetermined polarity.

To continue then, the pulse 31 of constant area is fed back to the common node 13 through the resistor 22.

Operation of the circuit of FIGURE 1 may be more clearly understood with reference to FIGURE 4 which illustrates the waveforms. It should be noted, however, that the waveforms shown are not to scale. The input signal applied to the common node 13 serves to charge the capacitor 17. Referring to FIGURE 4A, the capacitor charges at a rate which is dependent upon the input voltage and the capacitance. This rate is schematically illustrated in FIGURE 4A for three conditions as represented by waveforms 32a, 32b and 32c. The voltage rise is amplified by the amplifier 14. The output of the amplifier will be a waveform similar to that at the common node, FIGURE 4A, but having an amplitude dependent upon the gain of the amplifier. The pulse forming circuit is set to trigger at a predetermined value 33a, as previously described. In one example, the circuit was set to trigger at .5 volt. A rise in voltage of $.5 \times 10^{-8}$ volts at the common node 13 produced an amplified output voltage sufficient for triggering the pulse forming circuit.

Referring to FIGURE 4B, the feedback pulses 34a are shown. Thus, as the capacitor is charged and curve 32a reaches the voltage value indicated by the line 33a, the blocking oscillator is triggered to cause generation of a pulse 34a. In the illustrative example, a predetermined fixed voltage is applied for three cycles of the output frequency. A lower voltage is then applied whereby the capacitor charges at a slower rate. The pulses 34a occur at lower frequency. A high voltage is then applied whereby the pulses 34a occur at a relatively high frequency. It is apparent that when the input voltage is zero, that the capacitor does not charge and that pulses 34 will not be generated.

As previously described, the converter of the present invention is relatively independent of changes in capacitor characteristics and trigger level. This can be more clearly understood with reference to FIGURE 4. It is recalled that the pulse forming circuit 18 forms pulses each having a constant predetermined area, as illustrated in FIGURE 4B. Referring now particularly to curve 32a, it is seen that each time it reaches the value indicated by the line 33a a pulse 34a is applied which discharges the capacitor an amount corresponding thereto. The capacitor again charges until the voltage reaches 33a, at which time a pulse is formed which discharges the capacitor, etc.

Assume now that because of drift, the trigger level is raised as indicated by the line 33b. An error will be introduced during the first cycle as indicated by the distance 35. However, subsequent cycles will be at the correct frequency since the voltage pulses will discharge the capacitor a fixed amount. This is clear from the waveform 32b.

If the capacitor characteristics change, or if the capacitor is replaced, the system will still operate with the correct output frequency for a given input voltage. This is clearly illustrated by the waveform 32c. If the capacitor characteristics suddenly change, it will charge at a different rate, for example at a lower rate, as illustrated. An error represented by the distance 35 results for one cycle. However, when the next feedback pulse is applied to the capacitor, the voltage is not lowered as far and the frequency is correct for subsequent cycles.

The insensitivity to changes in trigger level and capacitor characteristics is achieved by employing a pulse forming circuit which provides pulses having a predetermined constant area.

It is observed that in the embodiment of FIGURE 1, the node 13 is at virtual ground at all times. Thus, it is possible to apply more than one input to the node. For example, other resistors 12a, 12b, etc. may be added which may be selectively switched to other inputs or permanently connected for addition or subtraction of voltage.

By providing a pair of pulse forming circuits, one of which is triggered when the voltage reaches a predetermined positive value and the other when the voltage reaches a predetermined negative value, and forming feedback pulses of opposite polarity, it is possible to construct a device which can measure voltages of either polarity, and which is suitable for giving an indication of the polarity and magnitude of the applied voltage.

Referring to FIGURE 2, such a circuit is illustrated. The circuit is similar to that of FIGURE 1 and like reference numerals are employed. The subscripts "a" refer to the circuitry involved in measuring positive voltages, and the subscript "b" to the circuitry for measuring negative voltages. Operation of the circuit is as previously described.

Referring to FIGURE 3, another embodiment of the invention is shown. The input is applied at the terminal 51 through the resistor 52 to the common node 53. A resistor 54 having a magnitude which is considerably greater than the magnitude of the resistor 52 is connected between the common node and ground. The capacitor 57 is connected in parallel with the resistor 54 and is charged by the input voltage. The voltage at the common node is amplified by an amplifier 58 and applied to a pulse forming network 59 of the type previously described which serves to derive pulses 61 of constant area. The pulses 61 are fed back through the resistors 62 to the common node. The output frequency is obtained at the terminal 62. Operation of the circuit is similar to that previously described.

Referring to FIGURE 6, a circuit diagram corresponding to block diagram of FIGURE 2 is shown. Like reference numerals are referred to like parts. The circuitry including the transistors 71 and 72 corresponds to the blocking oscillators for the pulse forming networks 18a and 18b (26 of FIGURE 5). The circuitry including the transistors 73 and 74, 76 and 77 corresponds to the amplifier 27 of FIGURE 5. The circuitry including the inductors 28a and 28b corresponds to the saturable reactor 28, FIGURE 5. The resistors 81, 82, 83 and 84 correspond to the resistance 22a, and the resistors 81, 86, 87 and 88 correspond to the resistor 22b.

The connection of the various elements is apparent and will not be described in detail. By way of example, a circuit was constructed in accordance with the figure in which the various components and voltages were as follows:

Voltages:
- $-V$ _____ volts__ $-10$
- $+V_1$ _____ do____ $300$
- $-V_1$ _____ do____ $-300$ Transistors:
- 71 and 72 _____ GT88
- 73, 74, 76, 77 _____ GT758

Diodes:
- 78, 79 _____ HD 6557 (Hughes)

Transformers:
- 28a, b _____ Dynac Type 1578–0001
- 80a, b _____ FF71–2248 (pulse eng.)

Resistors:
- 12 _____ ohms__ 900K
- 81 _____ megohm__ 1
- 82 _____ ohms__ 500K
- 83 _____ do____ 10K
- 84 _____ do____ 10K
- 86 _____ do____ 500K
- 87 _____ do____ 10K
- 88 _____ do____ 10K
- 89 _____ do____ 120K
- 91 _____ do____ 120K
- 92 _____ do____ 1K
- 93 _____ do____ 1K
- 94 _____ do____ 470K
- 96 _____ do____ 22
- 97 _____ do____ 22
- 98 _____ do____ 100
- 99 _____ do____ 470K
- 101 _____ do____ 100
- 102 _____ do____ 100
- 103 _____ do____ 100
- 104 _____ do____ 100
- 105 _____ do____ 100
- 106 _____ do____ 100
- 107 _____ do____ 560
- 108 _____ do____ 560
- 109 _____ do____ 120
- 111 _____ do____ 120
- 112 _____ do____ 680
- 113 _____ do____ 680
- 114 _____ do____ 22K
- 116 _____ do____ 22K
- 117 _____ do____ 1K
- 118 _____ do____ 47K
- 119 _____ do____ 47K
- 120 _____ do____ 1K Capacitors:
- 121 _____ μf__ .22
- 122 _____ μf__ .22
- 123 _____ mf__ .001

The amplifier employed was known as U.S.A. 3, Philbrick Research Inc., Boston.

Operation of the circuit was previously described with respect to the block diagrams.

A circuit in accordance with the foregoing was operated successfully over a range of voltages. For example, a voltage variation of zero to 1 volt gave a frequency variation at the output of zero cycles to 10,000 cycles per second. The apparatus was capable of determining voltages with an accuracy of 0.1% or better.

Thus, it is seen that an improved voltage to frequency converter is provided. The converter employs a capacitor in such a manner that the accuracy of the converter is not dependent upon capacitor characteristics and in which the capacitor is operated in an essentially linear manner irrespective of operating range. The circuit is also substantially independent of changes in trigger level.

I claim:

1. A voltage to frequency converter including a summing integrator having an input and an output, means to apply the voltage to be converted to the input of the summing integrator, pulse forming means serving to develop a pulse at each time the output of said summing integrator reaches a predetermined voltage level, means to reduce the magnitude of the output of said summing integrator by a fixed decrement, said last-named means comprising a feedback connection between the output of said pulse forming means and the input of said summing integrator, and output means connected to said pulse forming means.

2. A voltage to frequency converter according to claim 1 wherein said summing integrator comprises an amplifier and a capacitor connected in shunt therewith.

References Cited in the file of this patent

UNITED STATES PATENTS

| | | |
|---|---|---|
| 2,456,089 | Shenk et al. | Dec. 14, 1948 |
| 2,470,027 | Goldberg | May 10, 1949 |
| 2,497,411 | Krumhansl | Feb. 14, 1950 |
| 2,742,567 | Hansell | Apr. 17, 1956 |
| 2,767,378 | Hass | Oct. 16, 1956 |
| 2,817,061 | Bowers | Dec. 17, 1957 |
| 2,885,662 | Hansen | May 5, 1959 |